United States Patent Office 3,795,697
Patented Mar. 5, 1974

3,795,697
PGE₂ ESTERS AND ALKANOATES
Sune Bergstrom and Jan Sjovall, both % Kemiska Institutionen, Karolinska Institutet, Stockholm 60, Sweden
No Drawing. Continuation of abandoned application Ser. No. 115,113, Feb. 12, 1971, which is a continuation-in-part of application Ser. No. 203,752, June 20, 1962, now Patent No. 3,598,858, which is a continuation-in-part of abandoned application Ser. No. 199,209, Apr. 9, 1962, which in turn is a continuation-in-part of application Ser. No. 738,514, May 28, 1958, now Patent No. 3,069,322. This application Aug. 23, 1972, Ser. No. 283,045
Int. Cl. C07c 69/16, 69/74, 69/78
U.S. Cl. 260—468                                      10 Claims

ABSTRACT OF THE DISCLOSURE

Alkanoates and hydrocarbyl esters of the prostaglandins $PGE_2$ and $PGE_3$ are disclosed. These novel compounds are useful for a variety of pharmacological purposes, including use as smooth muscle stimulants and as cardiovascular agents.

CROSS REFERENCE TO RELATED APPLICATIONS

This application is a continuation of our copending application Ser. No. 115,113, filed Feb. 12, 1971, now abandoned, which is a continuation-in-part of our copending application Ser. No. 203,752, filed June 20, 1962, now Pat. No. 3,598,858, which is a continuation-in-part of our copending application Ser. No. 199,209, filed Apr. 9, 1962, now abandoned, which is a continuation-in-part of our copending application Ser. No. 738,514, filed May 28, 1958, now Pat. No. 3,069,322.

DESCRIPTION OF THE INVENTION

This invention relates to novel compositions of matter. One aspect of this invention is specifically concerned with novel organic compounds of the formula:

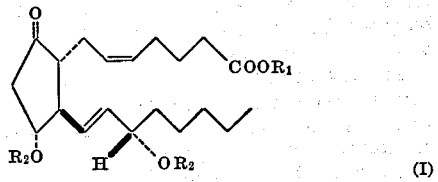

wherein $R_1$ is hydrocarbyl of 2 to 13 carbon atoms, inclusive, and $R_2$ is hydrogen or lower alkanoyl.

Another aspect of this invention is specifically concerned with novel organic compounds of the formula:

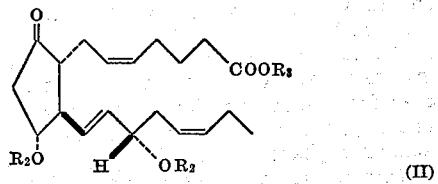

wherein $R_3$ is hydrocarbyl of one to 13 carbon atoms, inclusive, and $R_2$ is hydrogen or lower alkanoyl.

Another aspect of this invention is specifically concerned with novel organic compounds of the formula:

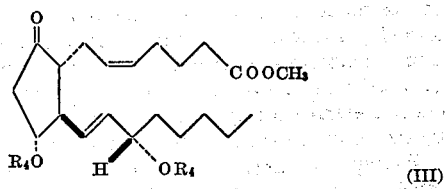

wherein $R_4$ is alkanoyl of 3 to 8 carbon atoms, inclusive.

Another aspect of this invention is specifically concerned with novel organic compounds of the formula:

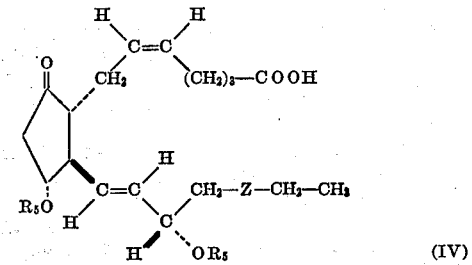

wherein Z is —$CH_2CH_2$— or cis-CH=CH—, and wherein $R_5$ is lower alkanoyl, and the pharmacologically acceptable salts thereof.

Molecules of the compounds encompassed by Formulas I, II, III, and IV each have several centers of asymmetry. Formulas I, II, III, and IV are intended to represent optically active compounds each with the same absolute configuration as optically active prostaglandin E (PGE), later named prostaglandin $E_1$ ($PGE_1$), and obtained from certain mammalian tissues, for example, sheep vesicular glands. See our said Pat. No. 3,069,322. See also later publications, for example, Bergstrom et al., J. Biol. Chem., 238, 3555 (1963), Bergstrom et al., Pharmacol. Rev., 20, 1 (1968), and references cited in those.

In Formulas I, II, III, and IV, a broken line attachment to the cyclopentane ring indicates a chain or group in alpha configuration, i.e., below the plane of the cyclopentane ring. A heavy solid line attachment to the cyclopentane ring indicates a chain in beta configuration, i.e., above the plane of the cyclopentane ring. The configuration of the side chain hydroxy in Formulas I, II, III, and IV is S.

These compounds of Formulas I, II, III, and IV are all variously esters, alkanoates, and ester-alkanoates of the prostaglandins designated now as $PGE_2$ and $PGE_3$, previously designated bisdehydro-PGE and tetradehydro-PGE. See our said copending application Ser. No. 203,752.

The structural formulas of $PGE_2$ (V) and $PGE_3$ (VI) are as follows:

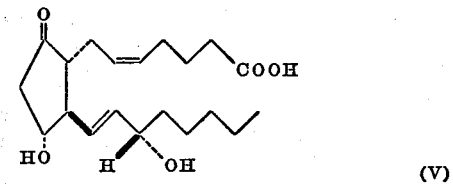

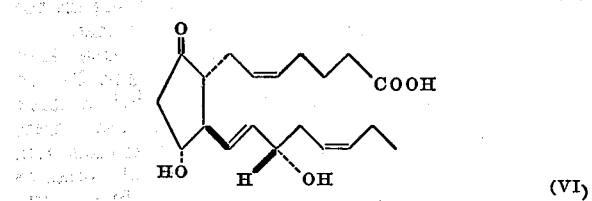

A systematic name for $PGE_2$ is 7-[3α-hydroxy-2β-[(3S) - 3 - hydroxy-trans-1-octenyl] - 5 - oxo-1α-cyclopentyl]-cis-5-heptenoic acid. A systematic name for $PGE_3$ is 7-[3α-hydroxy-2β-[(3S) - 3 - hydroxy-trans-1,cis-5-octadienyl]-5-oxo-1α-cyclopentyl]-cis-5-heptenoic acid.

With regard to Formula 1, examples of hydrocarbyl of 2 to 13 carbon atoms, inclusive, are alkyl, e.g., ethyl, propyl, hexyl, decyl; cycloalkyl, e.g., cyclopropyl, 2-butylcyclopropyl, cyclobutyl, cyclobutylmethyl, 3-pentylcyclobutyl, 2,2-dimethylcyclobutyl, cyclopentyl, 3-tert-butylcyclopentyl, 2-cyclopentylethyl, cyclohexyl, cyclohexylmethyl; aralkyl, e.g., benzyl, phenethyl, 1-phenylethyl, 2- phenylpropyl, 3-phenylbutyl, 2-(1-naphthylethyl), benzhydryl; aryl, e.g., phenyl, p-tolyl, p-ethylphenyl, p-tert-butylphenyl, 1-naphthyl; and such unsaturated moieties as allyl, crotyl, and propargyl.

With regard to Formula II, examples of hydrocarbyl of one to 13 carbon atoms, inclusive, are those mentioned above and also methyl.

With regard to Formula III, examples of alkanoyl of 3 to 8 carbon atoms, inclusive, are propionyl, butyryl, valeryl, hexanoyl, heptanoyl, octanoyl, and branched chain isomeric forms of those, e.g., isobutyryl and isovaleryl.

With regard to Formulas I, II, and IV examples of lower alkanoyl are alkanoyl of 2 to 8 carbon atoms, inclusive, e.g., those mentioned above and also acetyl.

The novel esters and alkanoates of Formulas I, II, III, and IV are extremely potent in causing stimulation of smooth muscle as shown, for example by tests on strips of guinea pig ileum, rabbit duodenum, or gerbil colon. These compounds are also highly active in potentiating other known smooth muscle stimulators, for example, oxytocic agents e.g., oxytocin and the various ergot alkaloids including derivatives and analogs thereof. Accordingly, these novel Formulas I, II, and III compounds are useful in place of or in combination with less than the usual amounts of these and other known smooth muscle stimulators whenever smooth muscle stimulation is needed to alleviate or prevent some physiological condition in mammals, including humans, useful domestic animals, pets, zoological specimens, and laboratory animals, for example, mice, rabbits, rats, and monkeys. For example, these compounds can be used to alleviate or prevent conditions of gastorintestinal atony in mammals, including humans, e.g., paralytic ileus following anesthesia and surgical operation or from other medical causes. For this purpose, the compound is administered parenterally, e.g., subcutaneously, intramuscularly or by intravenous injection or infusion in a dose range 0.1 to 2 mg. per kg. of body weight per day, the exact dose depending on the age, weight, and condition of the patient or animals, and the frequency and route of administration. Small repeated doses are indicated when the aim is to prevent rather than alleviate the atony.

Another smooth muscle stimulatory area where these novel Formula I, II, III, and IV compounds are useful, is in the control or prevention of atonic uteric bleeding in mammals after abortion or delivery, to aid in the expulsion of the placenta, and during the puerperium. For this purpose, the compound is administered by intravenous infusion immediately after abortion or delivery at a dose in the range about 0.1 to about 100 μg. per kg. of body weight per minute until the desired effect is obtained. Subsequent doses are given by intravenous, subcutaneous, or intramuscular injection or infusion during puerperium in the range 0.1 to 2 mg. per kg. of body weight per day, again the exact dose depending on the age, weight, and condition of the patient or animal.

In still another smooth muscle stimulatory area, these novel compounds of Formulas I, II, III, and IV are surprisingly useful in place of oxytocin to induce labor in pregnant female animals, including man, cows, sheep, and pigs, at or near term, or in pregnant animals with intrauterine death of the fetus from about 20 weeks to term. For this purpose, the compound is infused intravaneously at a dose of 0.1 to 100 μg. per kg. of body weight per minute until at or near the termination of the second stage or labor, i.e., expulsion of the fetus. These compounds are especially useful when the female is one or more weeks post-mature and natural labor has not started, or 12 to 60 hours after the membranes have ruptured and natural labor has not yet started. An alternative route of administration is oral.

The novel compounds of Formulas I, II, III, and IV are also surprisingly useful for controlling the reproductive cycle in ovulating female mammals, including humans and animals such as monkeys, rats, rabbits, dogs, cattle, and the like. By the term ovulating female mammals is meant animals which are mature enough to ovulate but not so old that regular ovulation has ceased. For that purpose, dihydro-PGE$_1$, for example, is administered systemically at a dose level in the range 0.1 mg. to about 20 mg. per kg. of body weight of the female mammal, advantageously during a span of time starting approximately at the time of ovulation and ending approximately at the time of menses or just prior to menses. Intravaginal and intrauterine are alternative routes of administration. Additionally, explusion of an embryo or a fetus is accomplished by similar administration of the compound during the first third of the normal mammalian gestation period.

The novel compounds of Formulas I, II, III, and IV are also useful in mammals, including man, as nasal decongestants. For this purpose, the compounds are used in a dose range of about 10 μg. to about 10 mg. per ml. of a pharmacologically suitable liquid vehicle or as an aerosol spray, both for topical application.

The novel compounds of Formulas I, II, III, and IV are useful in mammals, including man and useful animals, e.g., dogs and pigs, to reduce and control excessive gastric secretion, therey reducing or avoiding gastrointestinal ulcer formation, and accelerating the healing of such ulcers already present in the gastrointestinal tract. For this purpose, the compounds are injected or infused intravenously, subcutaneously, or intramuscularly in an infusion dose range about 1 μg. to about 100 μg. per kg. of body weight per minute, or in a total daily dose by injection or infusion in the range about one to about 50 mg. per kg. of body weight per day, the exact dose depending upon the age, weight, and condition of the patient or animal, and on the frequency and route of administration.

The novel Formula I, II, III, and IV compounds lower systemic arterial blood pressure in anesthetized (pentobarbital sodium) pentolinium-treated rats with indwelling aortic and right heart cannulas. Accordingly, these novel compounds are useful as hypotensive agents to reduce blood pressure in mammals, including man. For this purpose, the compounds are administered by intravenous infusion at the rate about 0.1 to about 100 μg. per kg. of body weight per minute, or in single or multiple doses of about 100 μg. to 5 mg. per kg. of body weight total per day.

The novel compounds of Formulas I, II, III, and IV are potent antagonists of epinephrine-induced mobilization of free fatty acids as shown, for example, by inhibition of the spontaneous release of glyceral from isolated fat pads. For this reason, these compounds are useful in experimental medicine for both in vitro and in vivo studies in mammals, including man, rabbits, and rats, intended to lead to the understanding, prevention, symptom alleviation, and cure of diseases involving abnormal lipid mobilization and high free fatty acid levels, e.g., diabetes mellitus, vascular diseases, and hyperthyroidism.

The novel Formula I, II, III, and IV compounds of this invention are used for the purposes described above in ester form (I, II, and III), in ester-alkanoate form (I, II, and III), and in alkanoate form (IV) either as the free acid or in pharmacologically acceptable salt form.

With regard to the ester forms of I and II, those can be any esters within the above definitons of $R_1$ or $R_3$. However it is preferred that the $R_1$ or $R_3$ moiety not contain olefinic or acetylenic unsaturation. More preferred are alkyl esters wherein the alkyl moiety contains two to 8 carbon atoms inclusive (I) or one to 8 carbon atoms inclusive (II). Especially preferred are alkyl of two to 4 carbon atoms inclusive (I), or one to 4 carbon atoms, inclusive (II). Of those alkyl, methyl (II) and ethyl (I) are especially preferred for optimum absorption of the compound by the body or experimental animal system.

Examples of alkyl of one to 4 carbon atoms are methyl, ethyl, propyl, isopropyl, butyl, isobutyl, sec-butyl and tert-butyl. Examples of alkyl of one to 8 carbon atoms are those mentioned above, and also pentyl, hexyl, heptyl, octyl, and branched chain isomers thereof, e.g., 2-ethylhexyl.

With regard to the alkanoate of ester-alkanoate forms of I, II, III, and IV, the alkanoyl moiety is any of those within the definition of $R_2$, $R_4$, and $R_5$. However, acetyl is especially preferred for optimum absorption of the compound by the body or experimental animal system. In Formulas I and II, it is intended that both $R_2$ be hydrogen or that both be alkanoyl.

Pharmacologically acceptable salts of Formula IV useful for the purposes described above are those with pharmacologically acceptable metal cations, ammonium, amine cations, or quaternary ammonium cations.

Especially preferred metal cations are those derived from the alkali metals, e.g., lithium, sodium and potassium, and from the alkaline earth metals, e.g., magnesium and calcium, although cationic forms of other metals, e.g., aluminum, zinc, and iron, are within the scope of this invention.

Pharmacologically acceptable amine cations are those derived from primary, secondary, or tertiary amines. Examples of suitable amines are methylamine, dimethylamine, triethylamine, ethylamine, dibutylamine, triisopropylamine, N-methylhexylamine, decylamine, dodecylamine, allylamine, crotylamine, cyclopentylamine, dicyclohexylamine, benzylamine, dibenzylamine, α-phenylethylamine, β-phenylethylamine, ethylenediamine, diethylenetriamine, and like aliphatic, cycloaliphatic, and araliphatic amines containing up to and including about 18 carbon atoms, as well as heterocyclic amines, e.g., piperidine, morpholine, pyrrolidine, piperazine, and lower-alkyl derivatives thereof, e.g., 1-methyl piperidine, 4-ethylmorpholine, 1-isopropylpyrrolidine, 2-methylpyrrolidine, 1,4-dimethylpiperazine, 2-methylpiperidine, and the like, as well as amines containing water-solubilizing or hydrophilic groups, e.g., mono-, di-, and triethanolamine, ethyldiethanolamine, N-butylethanolamine, 2-amino-1-butanol, 2-amino-2-ethyl-1,3-propanediol, 2-amino-2-methyl-1-propanol, tris(hydroxymethyl)aminomethane, N-phenylethanolamine, N-(p-tert-amylphenyl)diethanolamine, glactamine, N-methylglucamine, N-methylglucosamine, ephedrine, phenylephrine, epinephrine, procaine, and the like.

Examples of suitable pharmacologically acceptable quaternary ammonium cations are tetramethylammonium, tetraethylammonium, benzyltrimethylammonium, phenyltriethylammonium, and the like.

When the novel Formula I, II, III, and IV compounds are used for intravenous injection or infusion, sterile aqueous isotonic solutions are preferred. For subcutaneous or intramuscular injection, sterile solutions or suspensions of the compound in aqueous or non-aqueous media are used. Tablets, capsules, and liquid preparations such as syrups, elixirs, and simple solutions, with the usual pharmaceutical carriers, are used for oral or sublingual administration. For rectal, vaginal, or intrauterine administrations, suppositories, lavage and douche preparations, and solutions as such or contained in a sponge, all prepared by methods known in the art, are used.

The novel esters of Formula I wherein $R_2$ is hydrogen are prepared by esterification of the carboxylic acid known as $PGE_2$ (Formula V). The novel esters of Formula II wherein $R_2$ is hydrogen are prepared by esterification of the carboxylic acid known a $PGE_3$ (Formula VI). The preparation of these reactant acids $PGE_2$ and $PGE_3$ is described in our said copending application Ser. No. 203,752.

The novel dialkanoates of Formula III are prepared by carboxyacylating the methyl ester of $PGE_2$. That methyl ester is prepared as described below by esterification of $PGE_2$.

The novel dialkanoates of Formula IV are prepared by carboxyacylating $PGE_2$ (Z is —$CH_2CH_2$—) or by carboxyacylating $PGE_3$ (Z is cis-CH=CH—).

When an ester-alkanoate of Formula I or II is desired, that is preferably prepared by carboxyacylation of the corresponding ester rather than by esterification of the corresponding dialkanoate.

The esterification of $PGE_2$ and $PGE_3$ to produce the hydroxy esters of Formulas I and II (all $R_2$=H) is accomplished by procedures known in the art. These reactants $PGE_2$ and $PGE_3$ are sensitive to acid and base, and neutral esterification conditions are preferred. Illustratively, the alkyl esters of Formulas I and II are prepared by reaction of the acid, $PGE_2$ or $PGE_3$, with the appropriate diazohydrocarbon. For example, when diazomethane is used, the methyl esters are produced. Similar use of diazoethane, diazobutane, and 1-diazo-2-ethylhexane, for example, gives the ethyl, butyl, and 2-ethylhexyl esters, respectively.

Esterification with diazohydrocarbons is carried out by mixing a solution of the diazohydrocarbon in a suitable inert solvent, preferably diethyl ether, with the acid reactant, advantageously in the same or a different inert diluent. After the esterification reaction is complete, the solvent is removed by evaporation, and the ester purified if desired by conventional methods, preferably by chromatography. It is preferred that contact of the acid reactants with the diazohydrocarbon be no longer than necessary to effect the desired esterification, preferably about one to about ten minutes, to avoid undesired molecular changes. Diazohydrocarbons are known in the art or can be prepared by methods known in the art. See, for example, Organic Reactions, John Wiley & Sons, Inc., New York, N.Y., vol. 8, pp. 839–394 (1954).

An alternative method for esterification of the carboxyl moiety of $PGE_2$ or $PGE_3$ comprises transformation of the free acid to the corresponding silver salt, followed by interaction of that salt with an alkyl iodide. Examples of suitable iodides are methyl iodide, ethyl iodide, butyl iodide, isobutyl iodide, tert-butyl iodide, and the like. The silver salts are prepared by conventional methods, for example, by dissolving the acid in cold dilute aqueous ammonia, evaporating the excess ammonia at reduced pressure, and then adding the stoichiometric amount of silver nitrate.

By reacting diazomethane with $PGE_2$ as above described, the necessary ester reactant for the compounds of Formula III is prepared.

The ester-dialkanoates of Formulas I, II, and III, and the dialkanoates of Formula IV are prepared by reacting the corresponding dihydroxy compounds with the appropriate alkanoic anhydride, i.e., corresponding to an alkanoic acid of 2 to 8 carbon atoms, inclusive in the case of Formulas I, II, and IV, and corresponding to an alkanoic acid of 3 to 8 carbon atoms in the case of Formula III. Examples of these anhydrides are acetic anhydride, propionic anhydride, butyric anhydride, valeric anhydride, hexanoic anhydride, heptanoic anhydride, octanoic anhydride, and isomeric forms of those.

This reaction leading to these dialkanoates is advantageously carried out by mixing the hydroxy compound and the acid anhydride, preferably in the presence of a tertiary amine such as puridine or triethylamine. A substantial excess of the anhydride is used, preferably about 10 to 10,000 moles of anhydride per mole of the hydroxy compound reactant. The excess anhydride serves as a reaction diluent and solvent. An inert organic diluent, for example, dioxane, can also be added. It is preferred to use enough of the tertiary amine to neutralize the carboxylic acid produced by the reaction, as well as any free carboxyl groups present in the hydroxy compound reactant.

The reaction is preferably carried out in the range about 0° to about 100° C. The necessary reaction time will depend on such factors as the reaction temperature, and the nature of the anhydride and tertiary amine reactants. With acetic anhydride, pyridine, and a 25° C. reaction temperature, a 12 to 24-hour reaction time is used.

The desired dialkanoate is isolated from the reaction mixture by conventional methods. For example, the excess anhydride is decomposed with water, and the resulting mixture acidified and then extracted with a solvent such as diethyl ether. The desired dialkanoate is recovered from the diethyl ether extract by evaporation. The dialkanoate is then purified by conventional methods, advantageously by chromatography.

The novel Formula IV free acids are transformed to pharmacologically acceptable salts by neutralization with appropriate amounts of the corresponding inorganic or organic base, examples of which correspond to the cations and amines listed above. These transformations are carried out by a variety of procedures known in the art to be generally useful for the preparation of inorganic, i.e., metal or ammonium, salts, amine acid addition salts, and quaternary ammonium salts. The choice of procedure depends in part upon the solubility characteristics of the particular salt to be prepared. In the case of the inorganic salts, it is usually suitable to dissolve the acid in water containing the stoichiometric amount of a hydroxide, carbonate, or bicarbonate corresponding to the inorganic salt desired. For example, such use of sodium hydroxide, sodium carbonate, or sodium bicarbonate gives a solution of the sodium salt of the prostanoic acid derivative. Evaporation of the water or addition of a water-miscible solvent of moderate polarity, for example, a lower alkanol or a lower alkanone, gives the solid inorganic salt if that form is desired.

To produce an amine salt, the acid is dissolved in a suitable solvent of either moderate or low polarity. Examples of the former are ethanol, acetone, and ethyl acetate. Examples of the latter are diethyl ether and benzene. At least a stoichiometric amount of the amine corresponding to the desired cation is then added to that solution. If the resulting salt does not precipitate, it is usually obtained in solid form by addition of a miscible diluent of low polarity or by evaporation. If the amine is relatively volatile, any excess can easily be removed by evaporation. It is preferred to use stoichiometric amounts of the less volatile amines.

Salts wherein the cation is quaternary ammonium are produced by mixing the acid with the stoichiometric amount of the corresponding quaternary ammonium hydroxide in water solution, followed by evaporation of the water.

The invention can be more fully understood by the following examples.

EXAMPLE 1

PGE₃ methyl ester

To a dry ether solution of one milligram (2.8 micromoles) of $PGE_3$ is added a slight excess of diazomethane, prepared in ether from four micromoles of nitrosomethylurethane. The reaction mixture is allowed to stand for about five minutes, and the ether and excess diazomethane distilled off. On distillation to dryness, $PGE_3$ methyl ester is obtained; mass spectral peaks at 346, 328, 315, 297, 277, 259, and 188 mass spectral units.

EXAMPLE 2

PGE₂ ethyl ester

An ethereal solution of diazoethane is prepared by mixing 1.5 g. of N-ethyl-N-nitrosourea, 20 ml. of diethyl ether, and 4 ml. of 40% aqueous potassium hydroxide solution. The diethyl ether solution is decanted from the aqueous layer and is added dropwise to a solution of $PGE_2$ (300 mg.) in 50 ml. of ethanol until a yellow color remains. The mixture is then stirred for 15 minutes at 25° C. Evaporation under reduced pressure then gives $PGE_2$ ethyl ester.

Following the procedure of Example 2, $PGE_3$ is esterified to $PGE_3$ ethyl ester.

Following the procedures of Example 1 or 2 but replacing the diazomethane or the diazoethane with diazobutane, 1-diazo-2-ethylhexane, cyclohexyldiazomethane, and phenyldiazomethane, and using in turn $PGE_2$ and $PGE_3$, there are obtained the butyl, 2-ethylhexyl, cyclohexylmethyl, and benzyl esters of $PGE_2$ and $PGE_3$.

EXAMPLE 3

PGE₃ methyl ester diacetate $PGE_3$ methyl ester (10 mg.) is mixed with acetic anhydride (2 ml.) and pyridine (2 ml.). The resulting mixture is allowed to stand at 25° C. for 18 hours. The reaction mixture is then cooled externally with ice, diluted with water, and then acidified with dilute hydrochloric acid to pH 1. That mixture is extracted three times with diethyl ether. The combined extracts are washed successively with dilute hydrochloric acid, dilute aqueous sodium bicarbonate solution, and water, dried, and evaporated to give $PGE_3$ methyl ester triacetate.

Following the procedure of Example 3 but using propionic anhydride, isobutyric anhydride, and hexanoic anhydride each in place acetic anhydride, and using each in turn, $PGE_2$, $PGE_3$, and the methyl, ethyl, butyl, 2-ethylhexyl, cyclohexylmethyl, and benzyl esters of $PGE_2$ and $PGE_3$, there are obtained the dipropionates, diisobutyrates, and dihexanoates of these $PGE_2$ and $PGE_3$ acids and esters.

Also following the procedure of Example 3 but replacing $PGE_3$ methyl ester with $PGE_2$ ethyl ester, there is obtained $PGE_2$ ethyl ester diacetate.

What is claimed is:

1. A compound of the formula:

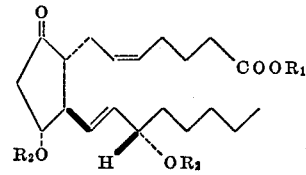

wherein $R_1$ is hydrocarbyl of 2 to 13 carbon atoms, inclusive, and wherein both $R_2$ are hydrogen or both $R_2$ are lower alkanoyl.

2. A compound according to claim 1 wherein $R_1$ is alkyl of 2 to 8 carbon atoms, inclusive, and both $R_2$ are hydrogen.

3. A compound according to claim 1 wherein $R_1$ is ethyl and both $R_2$ are hydrogen.

4. A compound according to claim 1 wherein $R_1$ is alkyl of 2 to 8 carbon atoms, inclusive, and both $R_2$ are lower alkanoyl.

5. A compound according to claim 1 wherein $R_1$ is alkyl of 2 to 8 carbon atoms, inclusive, and both $R_2$ are acetyl.

6. A compound according to claim 1 wherein $R_1$ is ethyl and both $R_2$ are acetyl.

7. A compound of the formula:

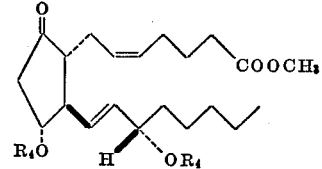

wherein $R_4$ is alkanoyl of 3 to 8 carbon atoms, inclusive.

8. A compound according to claim 7 wherein $R_4$ is propionyl.

9. A compound of the formula:
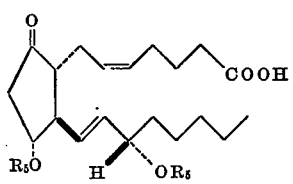
wherein both $R_5$ are lower alkanoyl, and the pharmacologically acceptable salts thereof.
10. A compound according to claim 9 wherein both $R_5$ are acetyl.
References Cited
Asplund: Acta Physiol. Scard., 13, 103 (1947).
Schneider et al.: JACS, 94, 2122 (1972).
LORRAINE A. WEINBERGER, Primary Examiner
R. GERSTL, Assistant Examiner
U.S. Cl. X.R.
260—410, 488 R, 514 D